ID:US011334488B2

United States Patent
Al Sheikh et al.

(10) Patent No.: US 11,334,488 B2
(45) Date of Patent: May 17, 2022

(54) CACHE MANAGEMENT CIRCUITS FOR PREDICTIVE ADJUSTMENT OF CACHE CONTROL POLICIES BASED ON PERSISTENT, HISTORY-BASED CACHE CONTROL INFORMATION

(71) Applicant: Microsoft Technology Licensing, LLC, Redmond, WA (US)

(72) Inventors: Rami Mohammad Al Sheikh, Morrisville, NC (US); Arthur Perais, Morrisville, NC (US); Michael Scott McIlvaine, Raleigh, NC (US)

(73) Assignee: Microsoft Technology Licensing, LLC, Redmond, WA (US)

(*) Notice: Subject to any disclaimer, the term of this patent is extended or adjusted under 35 U.S.C. 154(b) by 35 days.

(21) Appl. No.: 16/898,872

(22) Filed: Jun. 11, 2020

(65) Prior Publication Data
US 2021/0390054 A1    Dec. 16, 2021

(51) Int. Cl.
*G06F 12/0871* (2016.01)
*G06F 12/0855* (2016.01)
*G06F 12/0895* (2016.01)
*G06F 12/1018* (2016.01)
*G06F 12/121* (2016.01)

(52) U.S. Cl.
CPC ...... *G06F 12/0871* (2013.01); *G06F 12/0855* (2013.01); *G06F 12/0895* (2013.01); *G06F 12/1018* (2013.01); *G06F 12/121* (2013.01); *G06F 2212/1021* (2013.01)

(58) Field of Classification Search
CPC ............. G06F 12/0855; G06F 12/0871; G06F 12/0895; G06F 12/1018; G06F 12/121; G06F 2212/1021
See application file for complete search history.

(56) References Cited

U.S. PATENT DOCUMENTS

| 6,353,874 B1 * | 3/2002 | Morein ............... G06F 12/0802 711/100 |
| 2017/0293565 A1 | 10/2017 | Priyadarshi et al. | |

OTHER PUBLICATIONS

"International Search Report and Written Opinion Issued in PCT Application No. PCT/US21/026076", dated Jul. 20, 2021, 10 Pages (MS#408310-WO-PCT).

* cited by examiner

*Primary Examiner* — Aracelis Ruiz
(74) *Attorney, Agent, or Firm* — Withrow & Terranova, PLLC

(57) ABSTRACT

A cache management circuit that includes a predictive adjustment circuit configured to predictively generate cache control information based on a cache hit-miss indicator and the retention ranks of accessed cache lines to improve cache efficiency is disclosed. The predictive adjustment circuit stores the cache control information persistently, independent of whether the data remains in cache memory. The stored cache control information is indicative of prior cache access activity for data from a memory address, which is indicative of the data's "usefulness." Based on the cache control information, the predictive adjustment circuit controls generation of retention ranks for data in the cache lines when the data is inserted, accessed, and evicted. After the data has been evicted from the cache memory and is later accessed by a subsequent memory request, the persistently stored cache control information corresponding to that memory address increases the information available for determining the usefulness of data.

37 Claims, 6 Drawing Sheets

CACHE MANAGEMENT CIRCUITS FOR PREDICTIVE ADJUSTMENT OF CACHE CONTROL POLICIES BASED ON PERSISTENT, HISTORY-BASED CACHE CONTROL INFORMATION

FIELD OF THE DISCLOSURE

The technology of the disclosure relates to a cache memory system in a computer processor ("processor") and, more particularly, to cache control policies implemented by the cache memory system to control the insertion, promotion, and eviction of cache lines in cache memory in the cache memory system.

BACKGROUND

Computer processors, microprocessors, central processing units (CPUs), and any other type of processing circuits ("processors") execute computer software and firmware instructions that modify data. The instructions themselves, the data to be modified, and the resulting modified data can be stored in memory accessible to the processor. A processor is designed to process instructions and data quickly. In order to keep up with the execution speed of the processor and supply data at a sufficiently fast rate to avoid causing the processor to stall unnecessarily, a cache memory may be used. A cache memory is a small data storage area that may be dedicated to one or more processors and located physically closer to the processor(s) than to memory. Both the size of the cache memory and its proximity to the processor(s) allows the processor to access the cache memory very quickly. A cache memory system may include one or more levels of cache memory, with each level positioned increasingly farther from the processor and larger in storage capacity. However, a larger cache memory is slower in access time, because the speed with which data in a particular type of memory can be accessed is typically inversely related to its storage capacity. Therefore, the cache memories in a cache memory system are typically smaller in size than a main memory and thus have a more limited amount of space than the addressable size of the main memory. As data is read from the main memory for use by the processor, the data is stored in cache lines in a cache memory in the cache memory system. Similarly, data modified by the processor is stored in cache memory of the cache memory system. In this manner, the processor can quickly access the recently used or modified data, which is likely to be needed again soon. When the cache memory is full and the processor reads new data from the main memory, a cache controller must make room in the cache memory for the new data to be stored in a cache line. To this end, a cache line currently occupied with other data in the cache memory is removed or evicted to make room for new data to be stored in the cache line, which is referred to as "cache line eviction." A cache controller receives the memory access requests (e.g., read requests and write requests) from a processor, controls the cache memory to execute the requests, and also performs the cache line eviction. A cache controller first decides which cache line will be evicted from a cache memory based on a number of cache control policies.

One cache control policy is a replacement policy. A cache line replacement policy is a policy that uses a ranking system to identify a next cache line to be evicted when the cache controller needs to make room in a cache memory in the cache memory system for a newly inserted cache line. A situation in which data in a cache line is evicted from the cache memory and is then requested again by the processor soon after eviction causes inefficient operation in the cache memory system because time is wasted re-fetching the data from main memory. A good cache line replacement policy attempts to avoid inefficiency. A cache line insertion policy and cache line promotion policy are the other cache control policies that can affect the cache line replacement policy. A cache line insertion policy determines whether a new cache line should be inserted in a cache memory and if so, where the new cache line is ranked compared to other lines in the cache memory. The promotion policy determines how the ranking of a cache line (and the ranking of other cache lines) changes in case of a hit on that cache line due to a memory request by a processor. It is these cache control policies that determine whether the cache memory is operating efficiently. More efficient operation of the cache memory improves processor performance. For example, if a first cache line is evicted according to the cache control policies while another cache line remains in the cache memory, and the data that was stored in the first cache line is needed again by the processor before the other data, the efficiency of the cache memory is reduced. In this case, the processor's operation is unnecessarily slowed while the cache controller evicts a cache line and reinserts the needed data back into the cache memory. In another example of inefficient operation, the cache controller may load, into the cache memory, data that will only be used once by the processor before being evicted. This is known as cache pollution. The cache memory would operate more efficiently if such data was never inserted into a cache line because that could have been available to other, more frequently used data. Cache control policies that improve cache efficiency can improve processor performance and the user experience.

SUMMARY

Exemplary aspects disclosed herein include a cache management circuits for predictive adjustment of cache control policies based on persistent, history-based cache control information. Cache lines are storage locations in a cache memory used for faster access by a processor to stored data than retrieval from main memory. Data that has been accessed in a memory request is stored in a cache line in the cache memory system under the assumption that it may be accessed again soon by the processor, thereby alleviating the need to access the data from main memory. Under a cache control policy, a cache controller in the cache memory system assigns retention ranks to each cache line when data is initially stored and updates the retention ranks each time a cache line is accessed. The retention ranks indicate recent access activity of a cache line, which is used to determine which data has a higher likelihood of being evicted to make space for caching new data for a memory request. Preferably, the evicted data is least likely to be used by the processor.

In exemplary aspects disclosed herein, a cache management circuit is provided that includes a predictive adjustment circuit configured to predictively generate cache control information based on a cache hit-miss indicator and the retention ranks of accessed cache lines to improve cache efficiency. The predictive adjustment circuit stores the cache control information persistently, independent of whether the data remains in cache memory. The stored cache control information is indicative of prior cache access activity for data from a memory address, which is indicative of the data's "usefulness." Based on the cache control information, the predictive adjustment circuit controls generation of retention ranks for data in the cache lines when the data is inserted, accessed, and evicted. After the data has been evicted from the cache memory and is later inserted into the cache memory again when it is accessed by a subsequent memory request, the persistently stored cache control information corresponding to that memory address increases the information available for determining the usefulness of data. In this regard, the cache management circuit can increase efficiency of a cache memory system to improve processor performance.

In this regard, in a first exemplary aspect, a cache management circuit for predictive adjustment of a cache control policy based on persistent cache control information is provided. The cache management circuit is configured to receive a memory request comprising a memory address to access data at the memory address. The cache management circuit is further configured to receive a hit-miss indicator from a cache memory, the hit-miss indicator indicating a cache hit in response to the data at the memory address being stored in the cache memory and indicating a cache miss in response to the data at the memory address not being stored in the cache memory. The cache management circuit is further configured to generate cache control information corresponding to the memory address based on the hit-miss indicator and the cache control policy, store the cache control information corresponding to the memory address persistently, independent of the data being evicted from the cache memory, and control generation of a retention rank of a cache line based on the stored cache control information.

In another exemplary aspect, a method for predictive adjustment of a cache control policy based on persistent cache control information is provided. The method comprises receiving a memory request comprising a memory address to access data at the memory address. The method further comprises receiving a hit-miss indicator from a cache memory, the hit-miss indicator indicating a cache hit in response to the data at the memory address being stored in the cache memory and indicating a cache miss in response to the data at the memory address not being stored in the cache memory. The method further comprises generating cache control information corresponding to the memory address based on the hit-miss indicator and the cache control policy. The method further comprises storing the cache control information corresponding to the memory address persistently, independent of whether the data is evicted from the cache memory. The method further comprises controlling generation of a retention rank of a cache line based on the stored cache control information.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 1 is a diagram of an exemplary processor-based system that includes a processor configured to issue memory requests (i.e., data read and data write requests) to a memory system that includes a cache memory system and a main memory, wherein at least one cache memory in the cache memory system is configured to defer updating a cache state in response receiving a memory request from the processor until the memory request becomes non-speculative;

FIG. 2 is a schematic diagram of an exemplary cache memory system as part of an overall memory system in a processor-based system, wherein the cache memory system includes a plurality of cache memories that provide requested data, each cache memory having a cache management circuit configured to predictively adjust cache control policies and manage cache line evictions based on persistent, history-based cache control information;

Figure 2:
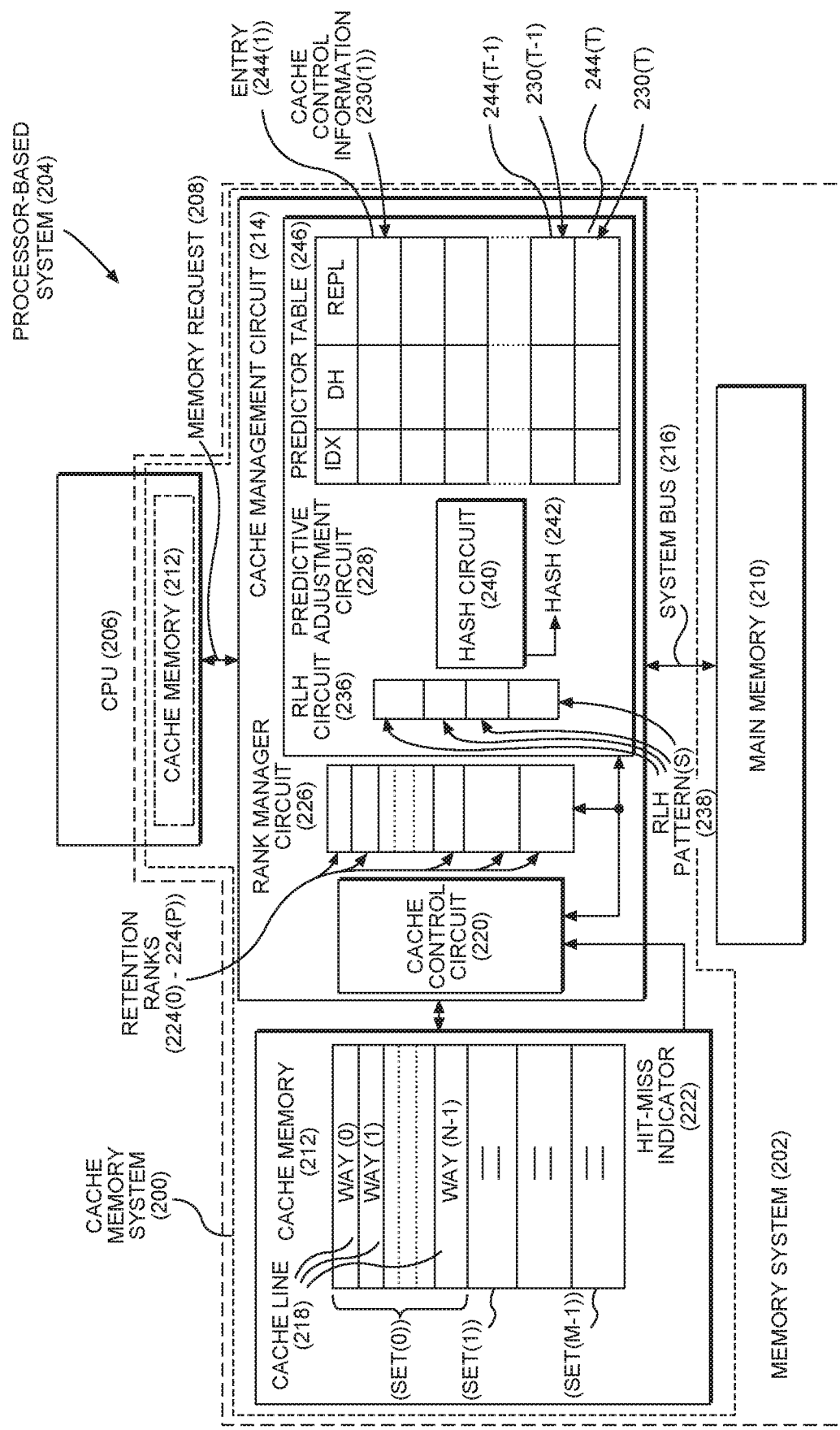
Figure 5:
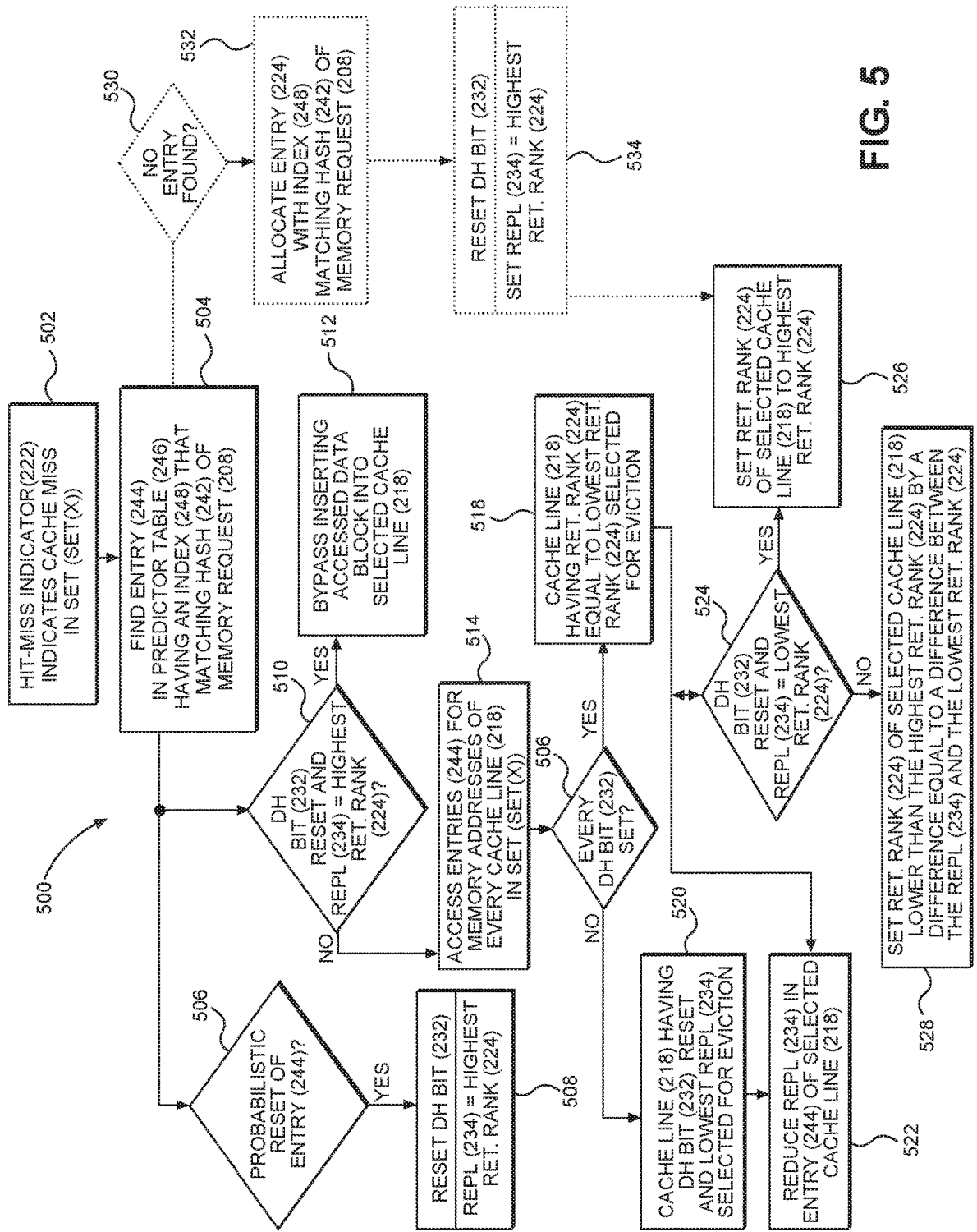
Figure 6:
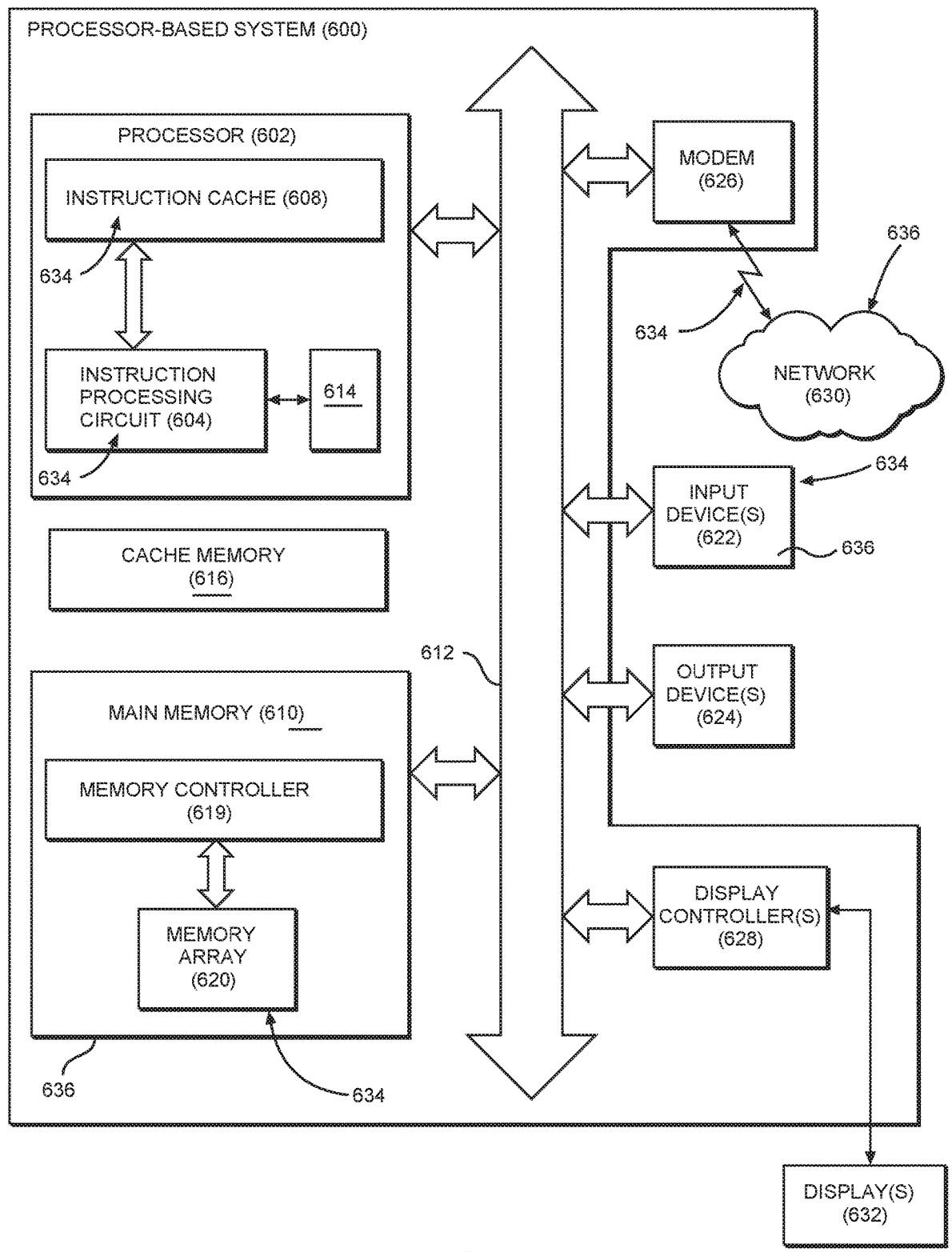

FIG. 5 is a flowchart of detailed operation of the cache management circuit illustrated in FIG. 2 in the case of a cache miss in an example in which the predictor table is untagged, which also corresponds to an example of a tagged predictor table where there is a predictor table hit, and also shows steps in the example with a tagged predictor table where there is a predictor table miss; and FIG. 6 is a block diagram of an exemplary processor-based system including a processor with a cache memory including the cache management circuit of FIG. 2.

DETAILED DESCRIPTION

Exemplary aspects disclosed herein include a cache management circuits for predictive adjustment of cache control policies based on persistent, history-based cache control information. Cache lines are storage locations in a cache memory used for faster access by a processor to stored data than retrieval from main memory. Data that has been accessed in a memory request is stored in a cache line in the cache memory system under the assumption that it may be accessed again soon by the processor, thereby alleviating the need to access the data from main memory. Under a cache control policy, a cache controller in the cache memory system assigns retention ranks to each cache line when data is initially stored and updates the retention ranks each time a cache line is accessed. The retention ranks indicate recent access activity of a cache line, which is used to determine which data has a higher likelihood of being evicted to make space for caching new data for a memory request. Preferably, the evicted data is least likely to be used by the processor.

In exemplary aspects disclosed herein, a cache management circuit is provided that includes a predictive adjustment circuit configured to predictively generate cache control information based on a cache hit-miss indicator and the retention ranks of accessed cache lines to improve cache efficiency. The predictive adjustment circuit stores the cache control information persistently, independent of whether the data remains in cache memory. The stored cache control information is indicative of prior cache access activity for data from a memory address, which is indicative of the data's "usefulness." Based on the cache control information, the predictive adjustment circuit controls generation of retention ranks for data in the cache lines when the data is inserted, accessed, and evicted. After the data has been evicted from the cache memory and is later inserted into the cache memory again when it is accessed by a subsequent memory request, the persistently stored cache control information corresponding to that memory address increases the information available for determining the usefulness of data. In this regard, the cache management circuit can increase efficiency of a cache memory system to improve processor performance.

Figure 1:
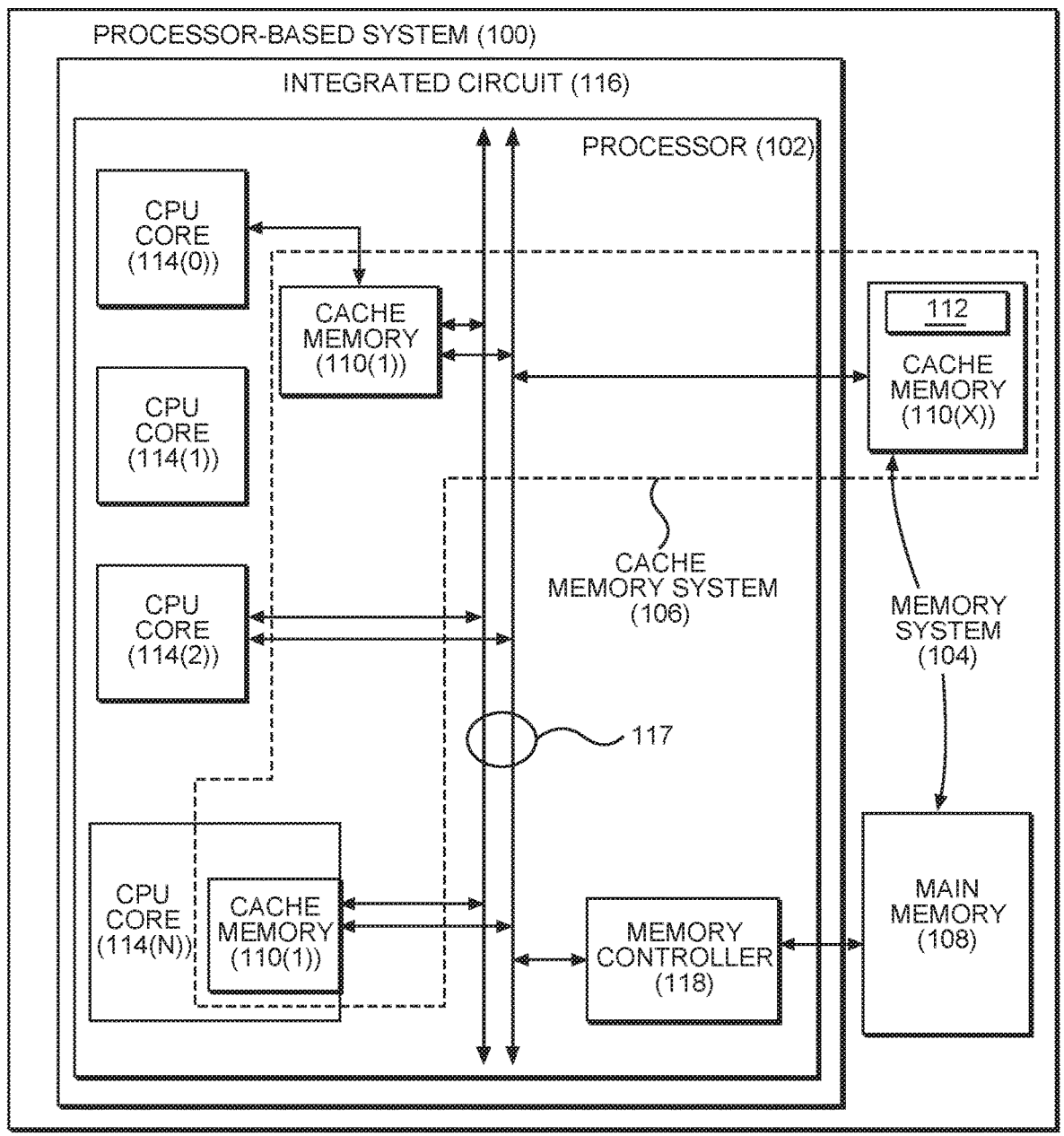

FIG. 1 is a diagram of a processor-based system 100 that includes a central processing unit (CPU) or processor 102 configured to issue memory requests (i.e., data read and data write requests) to a memory system 104 that includes a cache memory system 106 and a main memory 108. The main memory 108 may include dynamic random access memory (DRAM). The cache memory system 106 includes one or more cache memories 110(1)-110(X) that may be at different levels of hierarchy in the processor-based system 100. Any of the cache memories 110(1)-110(X) may include an exemplary cache management circuit 112, which is explained in further detail with reference to FIG. 2, configured to generate predictive cache control information based on a cache hit-miss indicator and cache line retention ranks and employ persistently stored, history-based cache control information to improve efficiency of the cache memories 110(1)-110(X) for improved performance of the processor 102. The processor 102 includes one or more CPU cores 114(1)-114(N), wherein 'N' is a positive whole number representing the number of CPU cores included in the processor 102. The processor 102 can be packaged in an integrated circuit (IC) chip 116. The cache memories 110(1)-110(X) may be logically located between the CPU cores 114(1)-114(N) and the main memory 108, where 'N' is a positive whole number representing the number of CPU cores included in the processor 102. The cache memories 110(1)-110(X) store or cache a subset of data contained in the main memory 108 to provide the CPU cores 114(1)-114(N) faster access to data in the main memory 108 for fulfilling memory requests. A memory controller 118 controls access to the main memory 108.

For example, a CPU core 114(1)-114(N) as a requesting device may issue a memory request to request data from the memory system 104 in response to processing a load instruction. The memory request includes a target address of the data to be read from memory. The memory request may also include an instruction identification (ID) identifying the instruction that caused the CPU core 114(1)-114(N) to issue the memory request. Using CPU core 114(1) as an example, if the requested data is not in a private cache memory 110(1) (i.e., a cache miss to the cache memory 110(1)) which may be considered a level one (L1) cache memory, the private cache memory 110(1) sends the memory request over an interconnect bus 117 in this example to a shared cache memory 110(X) shared to all the CPU cores 114(1)-114(N), which may be a level three (L3) cache memory. Other shared cache memories 110(2), 110(3) within the processor 102, which are only shared with a subset of the CPU cores 114(1)-114(N), may each be considered a level two (L2) cache memory. The requested data is eventually obtained from a cache memory 110(1)-110(X) or from the main memory 108. If the requested data is not contained in a lower level cache memory (e.g., 110(1)), a cache miss occurs and the data is received from a higher level cache memory (e.g., 110(X)) or from the main memory 108. A cache miss causes the receiving cache memory 110(1)-110(N) to evict data from a cache line, which holds a block of data corresponding to a memory address. Since the data in the cache line may have been updated, the evicted data from the cache line is sent out to a higher level memory and the requested data is stored in the cache line from which the data was evicted. Each cache memory 110(1)-110(X) has a cache control policy that governs which of its cache lines will be evicted to a higher level cache memory 110(1)-110(X) or the main memory 108 to make room to store new data corresponding to a memory request that resulted in a cache miss. Data is retained in the remaining cache lines in the cache memory 110(1)-110(X) when there is a cache miss.

FIG. 2 is a schematic diagram of an exemplary cache memory system 200 as part of a memory system 202 in a processor-based system 204. The processor-based system 204 includes a processor or CPU 206 that executes instructions resulting in memory requests 208 to the memory system 202 to read data into or write data out from the CPU 206. The memory system 202 includes a main memory 210. The cache memory system 200 includes a plurality of cache memories 212 at different levels of hierarchy between the CPU 206 and the main memory 210, each level typically having different storage capacity and access latency for responding to memory requests 208. A cache memory 212 at any level of hierarchy in the cache memory system 200 may include a cache management circuit 214 configured to predictively adjust cache control policies based on persistent, history-based cache control information and manage the eviction and insertion of new data in the cache memory 212 in response to a cache miss. The cache memory 212 in the memory system 202 is more closely coupled to the CPU 206 than the main memory 210 in the memory system 202. Thus, the cache memory 212 is able to provide faster access to data compared to the main memory 210, which is accessible over a system bus 216. The cache memory 212 in this example may be at any level in the memory system 202. For example, the cache memory 212 may be a level one (L1) cache memory unless the CPU 206 includes an optional internal cache memory 212, in which case the cache memory 212 would be a level two (L2) cache memory or higher.

The cache memory 212 in this example is an N-way, M-set associative cache, which means that the cache memory 212 is divided into M separately addressable sets SET(0)-SET(M−1), where M is a positive integer. Each of the sets SET(0)-SET(M−1) is addressed by a subset of the memory address such that many memory addresses correspond to each of the sets SET(0)-SET(M−1). Each of the sets SET(0)-SET(M−1) includes N ways WAY(0)-WAY(N−1), where N is also a positive integer. Each of the ways WAY(0)-WAY(N−1) is also referred to herein as a cache line 218, which refers to a high-speed storage area capable of storing a block of sequential data (i.e., bytes of data) addressable at a memory address. The cache lines 218 are not directly mapped to particular memory addresses. Thus, any memory address that corresponds to a particular set SET(X) of the sets SET(0)-SET(M−1) can be stored in any of the N cache lines 218 therein.

A memory request 208 from the CPU 206 includes a memory address and an indication of whether data is to be accessed (i.e., read from or written into) by the CPU 206 from the memory system 202. "Requested data" is a term that may be used herein to refer to data that is to be read into the CPU 206 from a memory address in a READ type memory request 208 or data at a storage location corresponding to the memory address where data is to be written (i.e., overwritten) in a WRITE type memory request 208. In the processor-based system 204 in FIG. 2, the memory request 208 is received at the cache management circuit 214. The cache management circuit 214 includes a cache control circuit 220 in this example that receives from the cache memory 212 a hit-miss indicator 222 indicating whether any of the cache lines 218 in the set SET(X) addressed by the memory request 208 contain the requested data. In this example, the requested data is a portion or all of a data block that will fit into a cache line 218. If the requested data is found in the cache memory 212, the hit-miss indicator 222 will indicate a cache hit and will also identify the cache line 218 containing the requested data. If none of the cache lines 218 in the set SET(X) addressed by the memory address in the memory request 208 contains the requested data, the hit-miss indicator 222 will indicate a cache miss in the cache memory 212.

When a cache miss occurs as the CPU 206 attempts to access a data block from the memory address contained in the memory request 208, the cache management circuit 214 is configured to direct the memory request 208 to the system bus 216 to obtain the requested data from the main memory 210. The cache management circuit 214 receives the requested data over the system bus 216 and stores the requested data in the cache memory 212. If the cache memory 212 is full, there is no space for the requested data to be stored unless one of the cache lines 218 is evicted, which means that data stored in the cache line 218 is sent to a higher level memory in the memory system 202, as discussed above. This allows the requested data to be stored in the evicted cache line 218. In a typical cache memory system, no information pertaining to the data evicted from the cache line 218 is saved.

The cache control circuit 220 determines which of the cache lines 218 in a set SET(X) is to be evicted in case of a cache miss based on retention ranks 224(0)-224(P), assigned to each of the cache lines 218 by a rank manager circuit 226. The retention ranks 224(0)-224(P) will be subsequently referred to herein individually or collectively as retention rank(s) 224. P+1 is an integer value equal to the number of cache lines 218 in the cache memory, such that there is a retention rank 224 for each cache line 218. The rank manager circuit 226 maintains the retention ranks 224 for each of the cache lines 218 in the cache memory 212. The cache line 218 with a lowest retention rank 224 will be evicted in a cache miss in this example. A lowest retention rank 224 assigned to a cache line 218 indicates that the cache line 218 may have the least usefulness to the processor compared to the data in the other cache lines 218. The cache control circuit 220 checks the rank manager circuit 226 to determine which cache line 218 has the lowest retention rank 224 and evicts the corresponding cache line 218. The rank manager circuit 226 generates a retention rank 224 for each cache line 218 based on a cache control policy. As a non-limiting example of a cache control policy, the rank manager circuit 226 may generate retention ranks 224 based on how recently cache lines 218 in a set SET(X) were inserted or accessed due to a cache hit. In this manner, the cache control policy indicates usefulness by assigning retention ranks according to how recently the data was accessed.

In an example, a set SET(X) with eight (8) ways or cache lines 218 may assign integer retention ranks 224 to the cache lines 218 in the range from 0 to 7, where a highest retention rank (7) is assigned to the cache line 218 that is most-recently used (MRU). A lowest retention rank (0) is assigned to the least-recently used (LRU) cache line 218, which means that all other cache lines 218 have been accessed more recently than the LRU cache line 218. Under such cache control policy (MRU/LRU), the MRU cache line 218 is deemed to have the highest usefulness because it is the most recently accessed. The LRU cache line 218 is deemed to have the least usefulness to the processor because all other cache lines 218 have been accessed more recently. Thus, the cache line 218 with the lowest retention rank 224 (LRU) is selected for eviction in case of a cache miss. No information pertaining to the retention ranks or cache activity related to the data evicted from the cache line 218 is saved when the data is no longer stored in the cache memory 212.

Continuing the above example of an underlying cache control policy, when the new data corresponding to the memory request 208 is stored, the rank manager circuit 226 generates new retention ranks 224, and the LRU cache line 218 becomes the MRU cache line 218. The retention ranks 224 for each of the other cache lines 218 are reduced, so there is a new LRU cache line 218 that may be the next evicted cache line 218 in case of a cache miss. If the CPU 206 issues a memory request 208 for which the requested data is in the LRU cache line 218, the hit-miss indicator 222 will indicate a cache hit and identify the LRU cache line 218. The rank manager circuit 226 will again generate new retention ranks 224 for each of the cache lines 218, with the LRU cache line 218 becoming the new MRU cache line 218, and the retention ranks 224 of each of the other cache lines 218 being reduced, so the cache line 218 that was assigned the retention rank 1 becomes the new LRU cache line 218 (i.e., with retention rank 0). The retention ranks 0 to 7 are only an example. Other numerical or non-numerical retention ranks 224 may be used to achieve the same purpose. In addition, the retention ranks 224 may be generated based on a different underlying cache control policy that is not based on how recently a cache line 218 is accessed. Any other such cache control policy for determining retention ranks 224 to identify a cache line 218 that is to be evicted and overwritten in the case of a cache miss may be predictively adjusted as further described herein.

In an exemplary aspect, the cache management circuit 214 further includes a predictive adjustment circuit 228 to control aspects of the cache control circuit 220 and the rank manager circuit 226 based on persistently stored, history-based cache control information 230(1)-230(T) corresponding respectively to T memory addresses, where T is an integer. One of the cache control information 230(1)-230(T) may be referred to herein as cache control information 230, unless otherwise noted. In some cases, controlling aspects of the cache control circuit 220 and the rank manager circuit 226 includes overriding normal operation of the cache control circuit 220 and the rank manager circuit 226, disregarding the underlying cache control policy.

Figure 3:
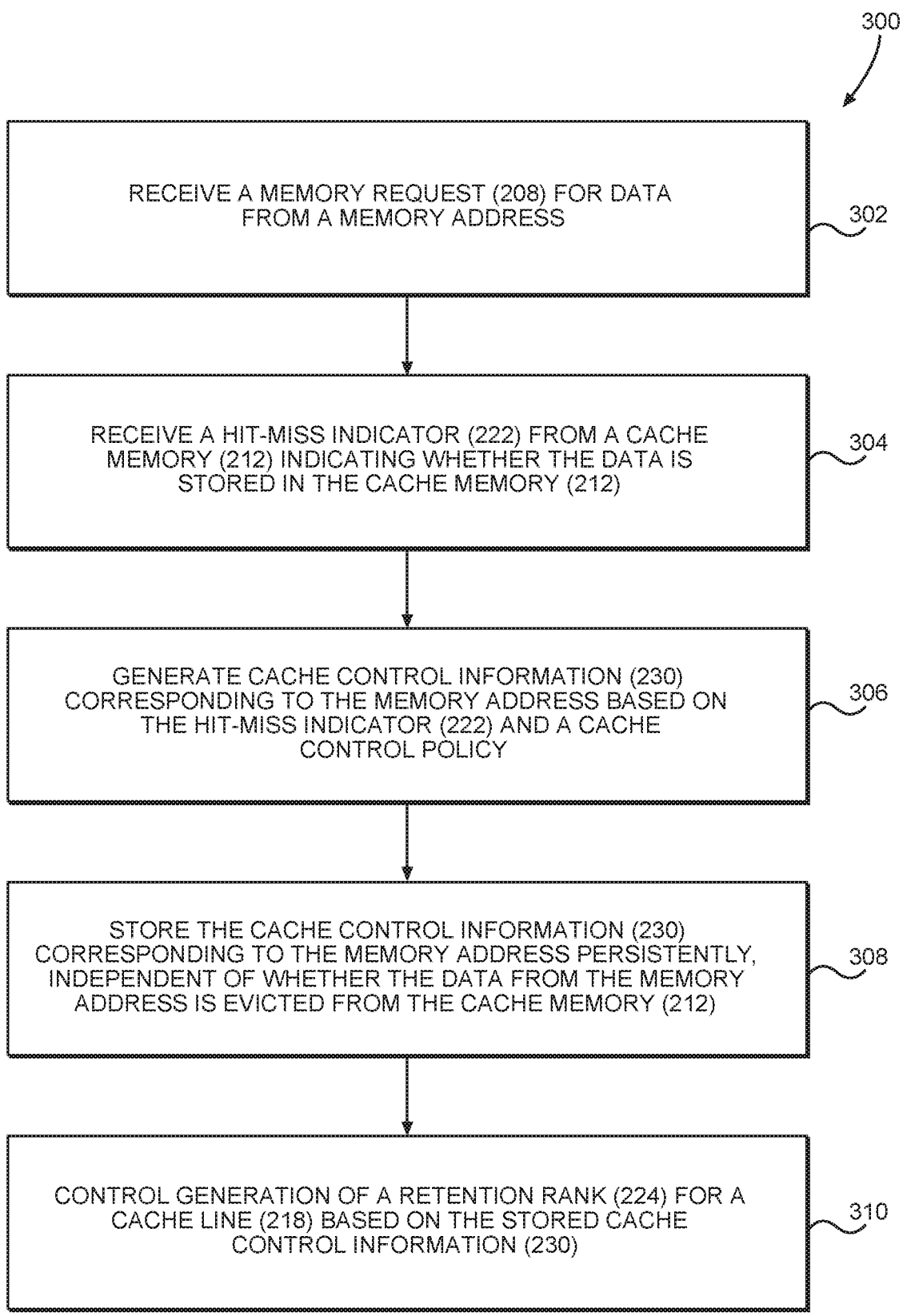
FIG. 3 is a flowchart illustrating an exemplary process for predictive adjustment of a cache control policy based on persistent, history-based cache control information, which may be performed in the cache management circuit in FIG. 2.

A flowchart illustrating an exemplary method 300 of predictive adjustment of cache control policy based on persistent, history-based cache control information, is shown in FIG. 3. The method 300 includes receiving a memory request 208 for data from a memory address (block 302). The method 300 also includes receiving a hit-miss indicator 222 from a cache memory 212 indicating whether the data is stored in the cache memory 212 (block 304). The method 300 further includes generating cache control information 230 corresponding to the memory address based on the hit-miss indicator 222 and the cache control policy (block 306). The method 300 includes storing the cache control information 230 corresponding to the memory address persistently, independent of whether the data from the memory address is evicted from the cache memory 212 (block 308). The method 300 still further includes controlling generation of a retention rank 224 of a cache line 218 based on the stored cache control information 230 (block 310).

Returning to FIG. 2, in some cases, the history of previous cache activity preserved in the persistent cache control information 230 may enable the cache management circuit 214 to make a more informed determination of, for example, which cache line 218 has the lowest usefulness, or what retention rank 224 should be assigned to a newly-inserted cache line 218. Thus, by overriding the existing cache control policy, the cache management circuit 214 can improve efficiency of the cache operation and correspondingly improve processor performance. In other cases, controlling aspects of the cache control circuit 220 and the rank manager circuit 226 involves merely allowing the cache control circuit 220 and the rank manager circuit 226 to follow the underlying cache control policy. In the case of cache control policies as described above (MRU/LRU), rather than assigning the highest retention rank 224 (MRU) to a cache line 218 in which new data is inserted, the cache management circuit 214 may assign a lower retention rank 224 to provide an opportunity for other useful data to remain in the cache for a longer period of time. In this regard, the cache control information 230 corresponding to a memory address may indicate a retention rank 224 of a cache line 218 the last time there was a cache hit on such data in the cache memory 212. This information can be used to predictively adjust the retention rank 224 when the data is later reinserted into the cache line 218. Alternatively, the cache management circuit 214 may determine that requested data should not be inserted into the cache memory 212 at all.

Further, the retention rank 224 assigned to a cache line 218 may not be set to the MRU when there is a cache hit on the cache line 218, even though such cache line 218 is the most-recently used. In this regard, the underlying promotion policy may be overridden to improve cache efficiency. The cache management circuit 214 may override an existing cache control policy as discussed above to allow other useful cache lines 218 an opportunity to stay in the cache memory 212 longer, which improves cache efficiency and improves performance of the CPU 206.

With reference to FIG. 2, the predictive adjustment circuit 228 generates the cache control information 230 in response to a memory request 208. The cache control information 230 is based on the hit-miss indicator 222 received from the cache memory 212 and on the retention rank 224 of a cache line 218 accessed by the memory request 208. Whether the memory request 208 results in a cache hit or a cache miss, the requested data from the memory address is stored in an accessed cache line 218. In the case of a cache hit, the accessed cache line 218 will be the cache line 218 identified by the hit-miss indicator 222 indicating where the data is stored. In the case of a cache miss, the accessed cache line 218 will be the evicted cache line 218 in which data from the memory address will be inserted.

In an optimal case, as described herein, the cache line 218 accessed in a cache hit will be the cache line 218 with the lowest retention rank 224. This indicates efficient operation of the cache memory 212 because a cache hit occurring on a cache line 218 that is currently assigned the lowest retention rank 224 means that data blocks in the other cache lines 218, which may still be useful, have a greater opportunity to remain in the cache memory 212 and be available for re-use by the CPU 206 compared to a case in which a cache hit occurs on a cache line 218 that is not assigned the lowest retention rank 224.

Achieving cache hits that are the optimal case as described above is an objective of the cache management circuit 214. To accomplish this exemplary objective, the predictive adjustment circuit 228 is configured to generate the cache control information 230 corresponding to a memory address and store the cache control information 230 persistently. Persistent storage of the cache control information 230 refers to retaining the cache control information 230 independent of whether data from the memory address is stored in any cache line 218 in the cache memory 212.

Thus, the cache control information 230 is stored in the predictive adjustment circuit 228 even after a cache line 218 storing the data for the memory address is evicted and the data is sent to a higher level of hierarchy in the cache memory system 200 or main memory 210. The cache control information 230 is persistently stored, because it provides a history of accesses to the corresponding memory address and such history can be employed to make predictions about future accesses to the same memory address. In this manner, it is possible to increase a probability that cache hits to the memory address will be the optimal cases. In a particular aspect, the predictive adjustment circuit 228 can control the rank manager circuit 226 to set a retention rank 224 for a cache line 218 in which data from a memory address is inserted. The setting of the retention ranks 224 is based, at least in part, on the stored cache control information 230 corresponding to the memory address.

With continued reference to FIG. 2, the cache control information 230 corresponding to a memory address is generated from the hit-miss indicator 222 and the retention ranks 224 of the cache line 218 accessed in a memory request 208 to the memory address. The cache control information 230 includes a did_hit (DH) indicator 232 and a replacement likelihood (REPL) 234 in this example. The DH indicator 232 may be implemented as a single binary bit in some examples. Thus, the DH indicator 232 may be referred to as DH bit 232 which is set to indicate that a cache hit occurred in response to a memory request 208 to the memory address. The DH bit 232 being in a reset state indicates no cache hit occurred on a cache line 218 in which the data is stored. The REPL 234 is a history-based retention rank that has a value of a retention rank 224 of a cache line 218 when a cache hit previously occurred on the corresponding memory address. The predictive adjustment circuit 228 provides such controls based on the DH bit 232 and the REPL 234.

The predictive adjustment circuit 228 attempts to create the optimal case described above in the cache memory 212 based on a history of cache activity associated with a memory address. Such information can be helpful in this regard because of the repetitive nature of data accesses of the instructions in a software program, module, script, application, etc. However, a particular memory address may be accessed by more than one part of a program and by more than one program. Thus, the history of cache activity associated with the memory address alone may be insufficient. To provide more relevant information, it is helpful to identify a specific instance of a memory address being requested based on information available within the cache memory 212 or the cache management circuit 214. In this regard, the predictive adjustment circuit 228 includes a replacement likelihood history (RLH) circuit 236 to record the retention ranks 224 of cache lines 218 accessed in the cache memory 212 in sequential order. The RLH circuit 236 may generate a single RLH pattern 238 of retention ranks 224 of all cache lines 218 accessed in the cache memory 212. In this regard, the RLH pattern 238 changes with every cache hit. Alternatively, the RLH circuit 236 may generate a separate RLH pattern 238 for each one of the sets SET(0)-SET(M−1) that contains a record of retention ranks 224 for only the cache lines 218 within a single set SET(X). In this example, only the RLH pattern 238 of a set in which the cache hit occurs will be updated. The RLH patterns 238 for the other sets would be unchanged.

Each RLH pattern 238 may be indicative of a particular sequence of instructions in a program or application, and thereby provides some context for a memory request 208 to a particular memory address, as explained below. As an example, if the retention ranks 224 are in a range from 7 to 0, an RLH pattern 238 of "7 7 7 3 0" means that cache lines 218 having the highest retention rank 224 of 7 were accessed three times in a row, followed by accessing a cache line 218 having a retention rank 224 of 3, followed by accessing a cache line 218 having the lowest retention rank 224 of 0.

Associating the cache control information 230 with both a memory address and the RLH pattern 238 existing at the time of an access to the memory address provides context that may make cache control information 230 more relevant to a particular point in a software application in which that memory address is accessed. Cache control information 230 for one occasion in which a memory address is accessed in a software application may be unhelpful, and potentially cause a reduction in efficiency, if used to predictively adjust the rank manager circuit 226 or the cache control circuit 220 when the memory address is accessed on another unrelated occasion within the software application.

Therefore, the predictive adjustment circuit 228 in this example also includes a hash circuit 240 that generates a hash 242 of a memory address of a memory request 208 and the RLH pattern 238 (e.g., as a numerical value) recorded when the memory request 208 is received. In this regard, each one of a plurality of entries 244(1)-244(T) in a predictor table 246 stores one of the cache control information 230(1)-230(T) related to both the memory address and an indication of recent activity in the cache memory 212 corresponding to the memory request 208. The entries 244(1)-244(T) may be referred to herein individually or collectively as entry 244 or entries 244, respectively. The predictive adjustment circuit 228 allocates the entry 244 in the predictor table 246 to store the DH bit 232 and the REPL 234 corresponding to the memory address and the RLH pattern 238. The entry 244 is identified by an index 248 matching the hash 242. Thus, the cache control information 230 in each entry 244 corresponds to a memory address and to a sequence of memory accesses in a program prior to that memory address being accessed. When there is another occurrence of an access to a memory address with the same sequence, or RLH pattern 238, the corresponding cache control information 230 is accessed and used for predictive control of the cache control circuit 220 and the rank manager circuit 226.

As noted, an entry 244 in the predictor table 246 is indexed by the hash 242 of the RLH pattern 238 and the memory address of a memory request 208. To evaluate the cache control information 230 corresponding to a memory address in a memory request 208, the entry 244 is found in the predictor table 246. The entry 244 is found by comparing the hash 242 to an index 248 of the entry 244. The entry 244 corresponding to a memory request 208 and an RLH pattern 238 is found when the hash 242 matches the index 248 in an entry 244. Matching, in this regard, means that at least a portion of the hash 242 is the same as at least a portion of the index 248. For example, if the hash 242 and the index 248 are multi-bit binary values, at least some of the bits of the hash 242 and the index 248 are the same.

The predictor table 246, according to the present disclosure, may be an untagged predictor table 246, a tagged predictor table 246, or a hybrid predictor table 246. In a first example of the present cache management circuit 214, the predictor table 246 is untagged. The cache management circuit finds an entry 244 by comparing the hash 242 of the memory request 208 to the indexes 248 of entries 244 in the predictor table 246. An untagged predictor table 246 includes indexes 248 that may match many different hashes 242, ensuring that the hash 242 generated for a memory request 208 will be matched with an index 248 of an entry 244 in the predictor table 246. In other words, in an example with an untagged predictor table 246, an entry 244 matching the hash 242 will be found. The index 248 of each entry 244 in an untagged predictor table 246 matching many different hashes 242 may be referred to as aliasing. In this regard, the cache control information 230 in the entry 244 having the matching index 248 may not be specific to the particular memory address and RLH pattern 238 that were the basis of the hash 242. Rather, the cache control information 230 in the entry 244 may not pertain at all to the memory address corresponding to the hash 242. In this regard, aliasing may cause constructive or destructive cache control information 230.

In a second example described herein, the cache management circuit 214 includes a tagged predictor table 246, in which a hash 242 may not match the index 248 of any entry 244. As in the first example including an untagged predictor table 246, the cache management circuit finds an entry 244 by comparing the hash 242 of the memory request 208 to the indexes 248 of entries 244 in the predictor table 246. In a tagged predictor table, the index 248 of an entry 244 may only match a single hash 242 or a small set of hashes 242, such that the cache control information 230 in each entry 244 may be more relevant and therefore more helpful in predictively adjusting the cache control policy. However, the hash 242 generated by the hash circuit 240 may not always correspond to an index 248 in the tagged predictor table 246. When the cache management circuit 214 proceeds to find an entry 244 with an index 248 that matches a hash 242, the cache management circuit 214 may be unsuccessful. After attempting to find the entry 244, the second example of the cache management circuit 214 determines that no entry 244 is found. This is referred to as a predictor table miss. A predictor table miss cannot happen in an untagged predictor table 246, as disclosed with regard to the first example of the cache management circuit 214 above. In the second example, including the tagged predictor table 246, there are circumstances under which no predictive adjustment is provided because no relevant cache control information 230 is found. In this situation, the cache control circuit 220 and the rank manager circuit 226 are allowed to operate according to an underlying cache control policy. In addition, the cache management circuit 214 allocates an entry 244 with an index 248 that matches the hash 242 corresponding to the RLH pattern 238 and the memory address of the memory request 208.

In a third example of the cache management circuit 214, a hybrid predictor table 246 and some of the entries 244 may be tagged while others are untagged, providing some benefits and disadvantages of the first example and the second example.

In an example, a set in a set-associative cache may have eight (8) ways or cache lines 218, and a cache control policy may have numerical integer retention ranks 224 in a range from 0 to 7, one for each cache line 218. In this example, the REPL 234 in an entry 244 having an index 248 that matches the hash 242 for a memory request 208 to a memory address may be any number from 0 to 7 requiring three (3) bits in each entry 244 for the REPL 234. However, if each entry 244 only includes two (2) bits for the REPL 234, each value of a REPL 234 will correspond to two different retention ranks 224 assigned to different cache lines 218. For example, the REPL 234 value of "0" represented as two binary digits may correspond to retention ranks 0 and 1, and the REPL value of "1" may correspond to retention ranks 2 and 3, etc.

In the cache management circuit 214 herein, in an example, if a retention ranking policy employs integer values from a lowest retention rank of "0" to a highest retention rank of "HRR" and there is no entry 244 in the predictor table 246 that matches the hash 242 of a memory request 208, a retention rank 224 of a cache line 218 is set to HRR by default (e.g., MRU). Similarly, if there is a matching entry 244 in which the cache control information 230 indicates a default state (e.g., DH bit 232=0 and REPL 234=HRR), the retention rank 224 of a cache line 218 is also set to HRR. If the cache control information 230 in the entry 244 indicates that there was not a cache hit on the data from the memory address when previously stored in a cache line 218, the insertion of the data into the cache line 218 is bypassed. If the cache control information 230 is not one of the above conditions, the cache control information 230 is assumed to be valid, and the selected cache line 218 is set to a retention rank 224 determined by the equation "HRR minus REPL 234" (i.e., HRR−REPL 234) under the object of achieving the optimal case described above.

For example, if requested data for a memory address is to be reinserted into the cache memory 212 due to a memory request 208 and the persistent cache control information 230 for the memory address includes REPL 234=2, this means that the last time there was a cache hit on the requested data before it was evicted from the cache memory 212, the retention rank 224 of the cache line 218 storing that requested data was "2." Assuming data activity in the cache memory 212 is repetitive, the retention rank 224 of the cache line 218 in which the data is reinserted could be set two retention ranks lower, such that the next cache hit would occur when the retention rank 224 for the cache line 218="0." This would allow data in two other cache lines 218 the opportunity to remain in the cache memory 212 longer, potentially making the cache memory system 200 operation more efficient. Specifically, in this example, if HRR=7, and REPL 234=2 for the requested data, the retention rank 224 of the cache line 218 upon insertion will be set to 7−2=5. Thus, the retention rank 224 of the selected cache line 218 is set lower than the highest retention rank 224 (i.e., 7 by an amount (2) equal to a difference between the REPL 234 (2) and the lowest retention rank 224 (0). As a result, a cache hit should occur on the subject data when the retention rank 224 for the cache line 218 is at the lowest retention rank 224, before the subject data is again evicted, as in the optimal case.

Descriptions of the operations of the cache management circuit 214, and more particularly the predictive adjustment circuit 228, under various circumstances of memory requests 208 to the cache memory 212 are provided below with reference to FIGS. 2 and 4-7.

Figure 4:
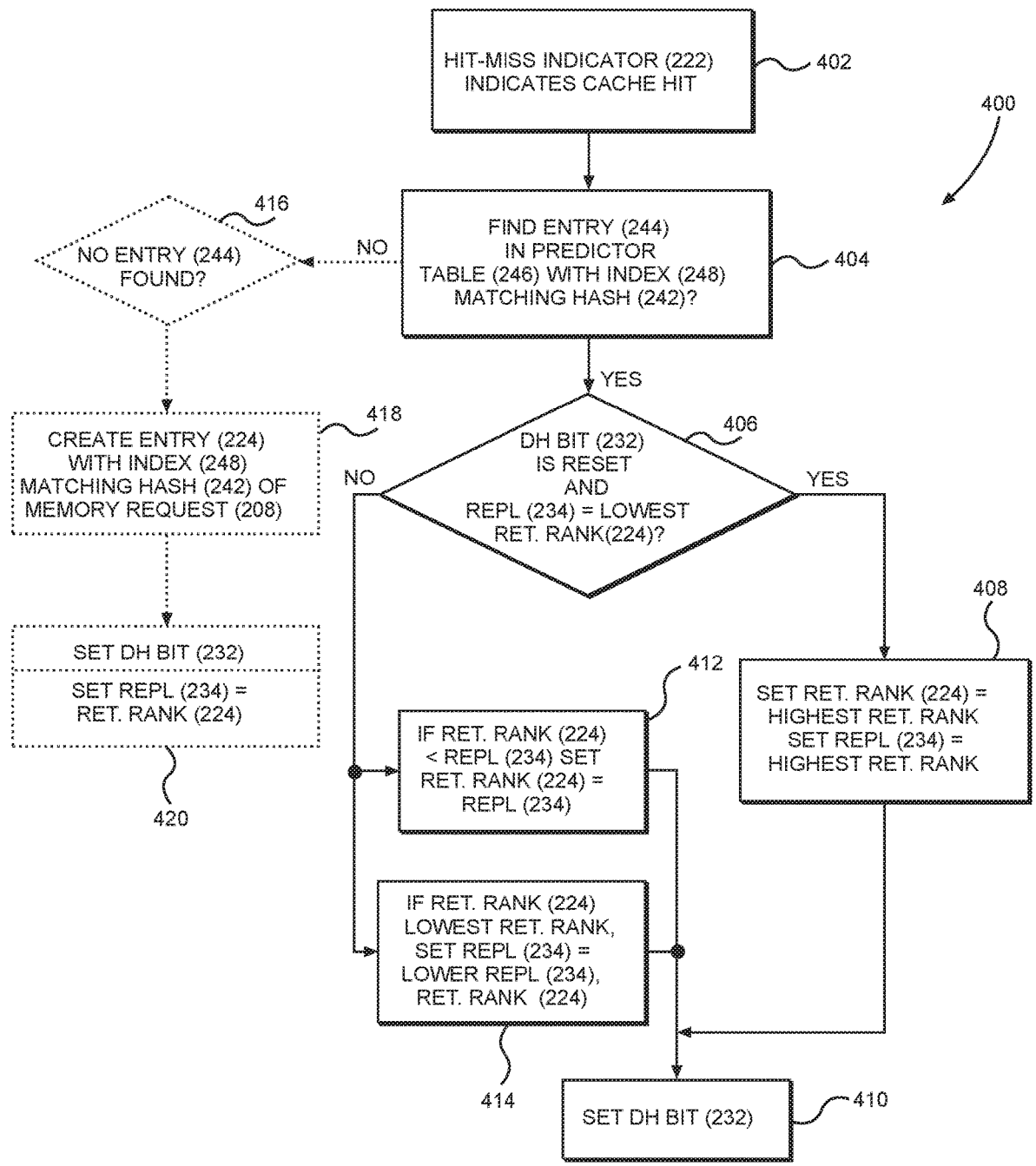
FIG. 4 is a flowchart of detailed operation of the cache management circuit illustrated in FIG. 2 in the case of a cache hit in an example in which the predictor table is untagged, which also corresponds to an example of a tagged predictor table where there is a predictor table hit, and also shows steps in the example with a tagged predictor table where there is a predictor table hit.

FIG. 4 is a flowchart illustrating an exemplary process 400 that can be performed by the cache management circuit 214 of FIG. 2 in response to a memory request 208 to a memory address in which the hit-miss indicator 222 indicates a cache hit on a cache line 218 in a set SET(X) (block 402). Flow of a cache management circuit 214 according to the first example, in which the predictor table 246 is untagged, is described first with reference to FIG. 4. A cache management circuit 214 according to the second example, having a tagged predictor table, is described with reference to FIG. 4 below.

After the cache management circuit 214 receives the hit-miss indicator indicating a cache hit, the predictive adjustment circuit 228 finds an entry 244 in the predictor table 24 with an index 248 matching the hash 242 that was generated for the memory request 208 (block 404). An aliasing situation can be recognized by the predictive adjustment circuit 228 upon inspecting the cache control information 230 in the entry 244 found after a cache hit and determining that the DH bit 232 is reset and the REPL 234 is set to the lowest retention rank 224 (block 406). Such combination of the DH bit 232 and the REPL 234 on a cache hit indicates an aliasing situation. In such case, the predictive adjustment circuit 228 responds as if there was not a hit on the predictor table 246. Specifically, the predictive adjustment circuit 228 will control the rank manager circuit 226 to set the retention rank 224 of the cache line 218 that was "hit" by the memory request 208 to the highest retention rank 224, and set the REPL 234 in the entry 244 to the highest retention rank 224 (block 408). The predictive adjustment circuit 228 also sets the DH bit 232 in the entry 244 (block 410).

If the predictive adjustment circuit 228 determines at block 406 that the DH bit 232 remains set (i.e., is not reset) or the REPL 234 is not set to the lowest retention rank 224, the predictive adjustment circuit 228 determines that the information in the entry 244 does not indicate an aliasing situation. Subsequently, if the predictive adjustment circuit 228 determines that the retention rank 224 of the "hit" cache line 218 is lower than the REPL 234 in the entry 244 corresponding to the cache line 218, the predictive adjustment circuit 228 controls the rank manager circuit 226 to generate the new retention rank 224 of the cache line 218 to equal the current REPL 234 in the entry 244 (block 412). Also, if the predictive adjustment circuit 228 determines that retention rank 224 of the cache line 218 (at the time of the memory request 208) is not equal to the lowest retention rank 224, the predictive adjustment circuit 228 sets the REPL 234 in the entry 244 to the lower of the REPL 234 and the retention rank 224 of the cache line 218 (block 414). Here also, the predictive adjustment circuit 228 sets the DH bit 232 in the entry 244 (block 410).

A description of operation in the second example of the cache management circuit 214, in which the predictor table 246 is tagged, continues with reference to FIG. 4. In response to the hit-miss indicator 222 indicating a cache hit, the predictive adjustment circuit 228 compares the hash 242 to indexes 248 of the entries 244 in the predictor table 246 to find an entry 244 with an index 248 matching the hash 242 that was generated for the memory request 208 (block 404). When a matching entry 244 is found, this is referred to in the context of a tagged predictor table as a hit in the predictor table 246. This corresponds to the first example in which the predictor table is untagged because, in the first example, a matching entry 244 will be found. In this situation, operation of the cache management circuit 214 proceeds as discussed above with regard to the first example (blocks 406-414).

In the second example, there may not be an entry 244 in a tagged predictor table 246 with an index 248 matching a hash 242. Therefore, the following operations are only performed in the second example of the cache management circuit 214 because it includes a tagged predictor table 246. Here, the cache management circuit 214 may be unsuccessful in finding an entry 244 in the predictor table 246 and must determine whether an entry 244 is found (block 416). If not, this is referred to herein as a predictor table miss in which there is no entry 244 in the predictor table 246 matching the hash 242, as discussed below with reference to FIG. 6. In case it is determined that an entry 244 is not found in the predictor table 246 (block 416), an entry 244 with an index 248 matching the hash 242 is allocated in the predictor table 246 (block 418). Because there is a cache hit, the DH bit 232 is set (e.g., to 1) in the created entry 244, and the REPL 234 is set to the retention rank 224 of the cache line 218 in which the data block for the memory address of the memory request 208 was found (block 420). Blocks 416, 418, and 420 are shown here as optional because they are not included in operation of the cache management circuit 214 with an untagged predictor table 246.

FIG. 5 is a flowchart illustrating an exemplary process 500 of detailed operation of the cache management circuit 514 illustrated in FIG. 2 in the case of a cache miss. Flow of a the first example of the cache management circuit 214, in which the predictor table 246 is untagged, is described first with reference to FIG. 5. A cache management circuit 214 according to the second example, having a tagged predictor table, is described with further reference to FIG. 5 below.

The cache management circuit 214 determines the hit-miss indicator 222 indicating a cache miss in the set SET(X) corresponding to the memory address (block 502). In the case of the cache miss, the predictive adjustment circuit 228 selects a cache line 218 for eviction, and the data block for the memory request 208 is inserted in the selected cache line 218. After the cache management circuit 214 receives the hit-miss indicator indicating the cache miss, the predictive adjustment circuit 228 finds an entry 244 in the predictor table 246 with an index 248 that matches the hash 242 that was generated for the memory request 208 (block 504). In this regard, the predictive adjustment circuit 228 accesses entries 244 in the predictor table 246 corresponding to each of the cache lines 218 in the set SET(X) for the memory request 208 (block 504).

In some instances, particularly when aliasing occurs, the cache control information 230 in a previously existing entry 244 for a data block that is reinserted into the cache memory 212 upon a cache miss needs to be refreshed. Therefore, the predictive adjustment circuit 228 includes a determination of a probabilistic reset of the cache control information 230 in the entry 244 (block 506). That is, the DH bit 232 may be reset according to a probability and, upon the DH bit 232 being reset, the REPL 234 may be set to be equal to the highest retention rank 224. The probability determination for resetting the DH bit 232 may be in a range from zero (0), in which case the DH bit 232 is never reset, to one (1), in which case the DH bit 232 is always reset. The probability may be set statically or determined dynamically based on factors such as a number of entries 244 in the predictor table 246, or based on conditions or circumstances, such as the size of the data footprint, and/or particular behaviors or characteristics of an application that is the source of the memory requests 208. In this regard, in response to determining there will be a probabilistic reset of the entry 244, the predictive adjustment circuit 228 may probabilistically reset the DH bit 232 and, in response to the DH bit 232 being reset, set the REPL 234 to the highest retention rank 224 (block 508), according to the cache control policy. If the probabilistic reset is not performed, the cache control information 230 in the entry 244 remains unchanged for use by the cache management circuit 214. The above steps are directed to the cache control information 230 for the data at the memory address in the memory request 208. In addition, the cache management circuit 214 determines whether the new data will be inserted into a cache line 218 in the cache memory 212 and, if so, into which cache line.

Thus, the cache management circuit 214 determines if the DH bit 232 is reset and the REPL 234 is equal to the lowest retention rank 224 (block 510). If so, the predictive adjustment circuit 228 controls the cache control circuit 220 to bypass inserting (i.e., no insert) the accessed data block of the memory request 208 into the selected cache line 218 that was selected for eviction (block 512). That is, from the cache control information 230, it appears that, if the data block from the memory address of the memory request 208 is inserted into the cache memory 212, it is unlikely that it would be hit in a future memory request 208 before being evicted from the cache memory 212. Thus, the predictive adjustment circuit 228, based on the cache control information 230, determines that the data block for the memory request 208 will not be inserted (stored) in the cache memory 212. The cache line 218 selected for eviction is not evicted in this case.

The selection of a cache line 218 for eviction begins by accessing entries 244 for the memory addresses of data in every cache line 218 in the set SET(X) corresponding to the memory address (514). In response to determining the DH bit 232 in all of the accessed entries 244 are set (block 516), the cache management circuit 214 selects a cache line 218 having a retention rank 224 equal to the lowest retention rank 224 for eviction (block 518). On the other hand, in response to determining the DH bit 232 in at least one of the accessed entries 244 is reset (block 516), the predictive adjustment circuit 228 selects for eviction a cache line 218 among the cache lines 218 having the DH bit 232 reset with the lowest REPL 234 (block 520). In this case, the predictive adjustment circuit 228 also reduces the REPL 234 in the entry 244 of the cache line 218 selected for eviction (block 522), because the cache line 218 selected for eviction was never hit after initially being stored in the cache memory 212. Reducing the REPL 234 may mean decrementing the REPL 234 by one (1) or, if the REPL 234 is equal to the highest retention rank 224, setting the REPL 234 equal to the lowest retention rank 224.

After selection of the cache line 218 (blocks 518 or 520), the cache management circuit 214 controls generation of the retention rank of the cache line 218 based on the cache control information 230 corresponding to the memory address of the memory request 208. If the DH bit 232 is reset and the REPL 234 is equal to the highest retention rank 224 (block 524), there is not sufficient information about the data block for the memory request 208 to alter the cache control policy. Thus, the predictive adjustment circuit 228 controls the rank manager circuit 226 to set the retention rank 224 of the selected cache line 218, where the data block for the memory request 208 is inserted, to the highest retention rank 224 (block 526), according to the cache control policy.

Otherwise, in response to determining the DH bit 232 in the entry 244 is set or the REPL 234 in the entry 244 is not equal to the highest retention rank 224 (block 524), the predictive adjustment circuit 228 controls the rank manager circuit 226 to set the retention rank 224 of the selected cache line 218 lower than the highest retention rank 224 by a difference equal to a difference between the REPL 234 in the entry 244 and the lowest retention rank 224 (block 528).

Operation of the second example of the cache management circuit 214, in which the predictor table is tagged, continues with reference to FIG. 5. In the case of a cache miss and a predictor table hit, operation proceeds as discussed above with regard to the first example with an untagged predictor table. However, in this example, there may be a miss on the tagged predictor table 246. Thus, after the cache management circuit compares the hash 242 to the indexes of all entries 244 in the set SET(X) of the cache memory 212 corresponding to the memory address of the memory request 208, the cache management circuit deter-mines whether no entry 244 was found in the tagged predictor table 530. This determination (bock 530) and any subsequent steps performed in the second example in case of a predictor table miss are not performed in the first example with an untagged predictor table. In case it is determined that the hash 242 does not match an index 248 of an entry 244 in the predictor table 246 (block 530), an entry 244 with an index 248 matching the hash 242 is allocated in the predictor table 246 (block 416). Because there is a cache miss, the DH bit 232 is reset (e.g., to 0) in the allocated entry 244, and the REPL 234 is set to the highest retention rank 224 (block 534). The predictive adjustment circuit 228 also controls the rank manager circuit 226 to set the retention rank 224 of the selected cache line 218, where the data block for the memory request 208 is inserted, to the highest retention rank 224 (block 526).

FIG. 6 is a block diagram of an exemplary processor-based system 600 that includes a processor 602 (e.g., a microprocessor) that includes an instruction processing circuit 604. The processor-based system 600 can be the processor-based system 204 in FIG. 2 as an example. The instruction processing circuit 604 can be the CPU 206 in FIG. 2 as an example. The processor-based system 600 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server, or a user's computer. In this example, the processor-based system 600 includes the processor 602. The processor 602 represents one or more general-purpose processing circuits, such as a microprocessor, central processing unit, or the like. More particularly, the processor 602 may be an EDGE instruction set microprocessor, or other processor implementing an instruction set that supports explicit consumer naming for communicating produced values resulting from execution of producer instructions. The processor 602 is configured to execute processing logic in instructions for performing the operations and steps discussed herein. In this example, the processor 602 includes an instruction cache 608 for temporary, fast access memory storage of instructions accessible by the instruction processing circuit 604. The instruction cache 608 can include the cache memory 212 and the cache management circuit 214 in FIG. 2. Fetched or prefetched instructions from a memory, such as from a main memory 610 over a system bus 612, are stored in the instruction cache 608. The instruction processing circuit 604 is configured to process instructions fetched into the instruction cache 608 and process the instructions for execution. The processor 602 can include a register rename map table 614 for tracking logical to physical register mapping.

The processor-based system 600 can also include a cache memory 616, which may be one or more of the cache memories 110(1)-110(X) in FIG. 1 or the cache memory 212 in FIG. 2. In this regard, the cache memory 616 may also include the cache management circuit 214 in FIG. 2.

The processor 602 and the main memory 610 are coupled to the system bus 612 and can intercouple peripheral devices included in the processor-based system 600. As is well known, the processor 602 communicates with these other devices by exchanging address, control, and data information over the system bus 612. For example, the processor 602 can communicate bus transaction requests to a memory controller 619 in the main memory 610 as an example of a slave device. Although not illustrated in FIG. 6, multiple system buses 612 could be provided, wherein each system bus constitutes a different fabric. In this example, the memory controller 619 is configured to provide memory access requests to a memory array 620 in the main memory 610. The memory array 620 is comprised of an array of storage bit cells for storing data. The main memory 610 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 612. As illustrated in FIG. 6, these devices can include the main memory 610, one or more input devices 622, one or more output devices 624, a modem 626, and one or more display controllers 628, as examples. The input device(s) 622 can include any type of input device, including, but not limited to, input keys, switches, voice processors, etc. The output device(s) 624 can include any type of output device, including, but not limited to, audio, video, other visual indicators, etc. The modem 626 can be any device configured to allow exchange of data to and from a network 630. The network 630 can be any type of network, including, but not limited to, a wired or wireless network, a private or public network, a local area network (LAN), a wireless local area network (WLAN), a wide area network (WAN), a BLUETOOTH™ network, and the Internet. The modem 626 can be configured to support any type of communications protocol desired. The processor 602 may also be configured to access the display controller(s) 628 over the system bus 612 to control information sent to one or more displays 632. The display(s) 632 can include any type of display, including, but not limited to, a cathode ray tube (CRT), a liquid crystal display (LCD), a plasma display, etc.

The processor-based system 600 in FIG. 6 may include a set of instructions 634 to be executed by the processor 602 for any application desired according to the instructions. The instructions 634 may be stored in the main memory 610, processor 602, and/or instruction cache 608 as examples of a non-transitory computer-readable medium 636. The instructions 634 may also reside, completely or at least partially, within the main memory 610 and/or within the processor 602 during their execution. The instructions 634 may further be transmitted or received over the network 630 via the modem 626, such that the network 630 includes computer-readable medium 636.

While the computer-readable medium 636 is shown in an exemplary embodiment to be a single medium, the term "computer-readable medium" should be taken to include a single medium or multiple media (e.g., a centralized or distributed database, and/or associated caches and servers) that stores the one or more sets of instructions. The term "computer-readable medium" shall also be taken to include any medium that is capable of storing, encoding, or carrying a set of instructions for execution by the processing device and that causes the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.), and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A cache management circuit for predictive adjustment of a cache control policy based on persistent cache control information, the cache management circuit configured to:
   receive a memory request comprising a memory address to access data at the memory address;
   receive a hit-miss indicator from a cache memory, the hit-miss indicator indicating a cache hit in response to the data at the memory address being stored in the cache memory and indicating a cache miss in response to the data at the memory address not being stored in the cache memory;

generate cache control information corresponding to the memory address based on the hit-miss indicator and the cache control policy;
store the cache control information corresponding to the memory address persistently, independent of the data being evicted from the cache memory; and
control generation of a retention rank of a cache line based on the stored cache control information;
a predictor table comprising a plurality of entries for storing the cache control information, each entry corresponding to a memory address, the cache management circuit further configured to store the cache control information in an entry in the predictor table corresponding to the memory address in the memory request; and
a replacement likelihood history (RLH) circuit configured to store an RLH pattern comprising retention ranks of cache lines in the cache memory accessed in consecutive memory requests, the cache management circuit further configured to:
record an RLH pattern corresponding to the received memory request;
generate a hash of the RLH pattern and the memory address of the memory request; and
store the cache control information in the entry of the predictor table corresponding to the memory address of the memory request, the entry comprising an index matching the hash.

2. The cache management circuit of claim 1, configured to record the RLH pattern by being configured to record the RLH pattern comprising retention ranks of all cache lines accessed in the cache memory.

3. The cache management circuit of claim 1, wherein:
the cache memory is a set-associative cache memory comprising a plurality of sets, each set corresponding to a plurality of memory addresses and each set comprising a plurality of cache lines configured to store data; and
the cache management circuit is further configured to record the RLH pattern comprising retention ranks of all cache lines accessed in a set of the plurality of sets of the set-associative cache memory corresponding to the memory address.

4. The cache management circuit of claim 1, configured to store the cache control information in the entry in the predictor table by being further configured to:
store a did_hit indicator indicating a cache hit corresponding to the memory address in the entry in the predictor table; and
store a replacement likelihood (REPL) indicating a predictive rank for the cache line based on the retention rank of the cache line in the entry in the predictor table.

5. The cache management circuit of claim 4, further configured to, in response to the hit-miss indicator indicating a cache hit for the memory address in the memory request:
find a matching entry in the predictor table comprising an index that matches the hash of the RLH pattern and the memory address of the memory request;
determine that the did_hit indicator in the matching entry is reset;
determine that the REPL in the matching entry is equal to a lowest retention rank; and
in response to determining that the did_hit indicator in the matching entry is reset and the REPL in the matching entry is equal to the lowest retention rank:
set the retention rank of the cache line to a highest retention rank;
set the REPL in the matching entry equal to the highest retention rank; and
set the did_hit indicator in the matching entry.

6. The cache management circuit of claim 5, further configured to:
in response to determining that the did_hit indicator in the matching entry is set or determining that the REPL in the matching entry is not equal to the lowest retention rank:
determine that the retention rank of the cache line is lower than the REPL in the matching entry;
in response to determining that the retention rank of the cache line is lower than the REPL in the matching entry, set the retention rank of the cache line to the REPL in the matching entry; and
set the did_hit indicator in the matching entry.

7. The cache management circuit of claim 5, further configured to:
in response to determining that the did_hit indicator in the matching entry is set or determining that the REPL in the matching entry is not equal to the lowest retention rank:
determine that the retention rank of the cache line is not equal to the lowest retention rank;
in response to determining that the retention rank of the cache line is not equal to the lowest retention rank, set the REPL in the matching entry equal to the lowest retention rank; and
set the did_hit indicator in the matching entry.

8. The cache management circuit of claim 5, further configured to:
determine that no entry is found in the predictor table comprising an index that matches the hash of the RLH and the memory address of the memory request;
in response to determining that no entry in the predictor table is found comprising an index that matches the hash of the RLH and the memory address of the memory request:
allocate an entry in the predictor table comprising an index that matches the hash of the RLH and the memory address of the memory request;
set the REPL in the allocated entry equal to the retention rank of the cache line; and
set the did_hit indicator.

9. The cache management circuit of claim 4, the cache management circuit is further configured to, in response to the hit-miss indicator indicating a cache miss for the memory address in the cache line:
find a matching entry in the predictor table comprising an index that matches the hash of the RLH pattern and the memory address of the memory; and
in response to a probability determination:
reset the did_hit indicator; and
set the REPL to a highest retention rank.

10. The cache management circuit of claim 9, wherein the probability determination ranges from a value at which the did_hit indicator is never reset to a value at which the did_hit indicator is always reset.

11. The cache management circuit of claim 9, wherein the probability determination is based on a number of entries in the predictor table.

12. The cache management circuit of claim 9, further configured to:
determine that no entry in the predictor table comprises an index that matches the hash of the RLH and the memory address of the memory request;

in response to determining that no entry in the predictor table is found comprising an index that matches the hash of the RLH and the memory address of the memory request:
    allocate an entry in the predictor table comprising an index that matches the hash of the RLH and the memory address of the memory request;
    set the REPL in the allocated entry equal to the highest retention rank;
    reset the did_hit indicator; and
    set the retention rank of the cache line selected for eviction to the highest retention rank.

13. The cache management circuit of claim 4, wherein:
the cache memory is a set-associative cache memory comprising a plurality of sets, each set comprising a plurality of cache lines configured to store data, each cache line configured to store data corresponding to a memory address; and
the cache management circuit is further configured to, in response to the hit-miss indicator indicating a cache miss for the memory address in the memory request:
    find a matching entry in the predictor table comprising an index that matches the hash of the RLH pattern and the memory address of the memory request;
    determine that the did_hit indicator in the matching entry is reset;
    determine that the REPL in the matching entry is equal to a lowest retention rank;
    in response to determining that the did_hit indicator in the matching entry is reset and the REPL in the matching entry is equal to the lowest retention rank, bypass inserting the data at the memory address into the cache memory.

14. The cache management circuit of claim 13, further configured to:
in response to determining that the did_hit indicator in the matching entry is set or the REPL in the matching entry is not equal to the lowest retention rank:
access entries of the predictor table corresponding to the memory addresses of data in every cache line in a set of the set-associative cache memory corresponding to the memory address in the memory request;
determine that the did_hit indicator in every accessed entry is set;
in response to determining that the did_hit indicator in every accessed entry is set, select for eviction a cache line of the accessed cache lines comprising a retention rank equal to the lowest retention rank;
in response to determining that the did_hit indicator in at least one accessed entry is reset:
    select for eviction a cache line of the at least one accessed cache lines comprising a lowest retention rank;
    reducing the REPL in the entry of the predictor table corresponding to the memory address of the data stored in the cache line selected for eviction.

15. The cache management circuit of claim 14, further configured to:
determine that the did_hit indicator in the matching entry is reset;
determine that the REPL in the matching entry is equal to a highest retention rank; and
in response to determining that the did_hit indicator in the matching entry is reset and the REPL in the matching entry is equal to the highest retention rank, set the retention rank of the cache line selected for eviction to the highest retention rank.

16. The cache management circuit of claim 15, further configured to:
in response to determining that the did_hit indicator in the matching entry is set or the REPL in the matching entry is not equal to the highest retention rank, set the retention rank of the cache line selected for eviction lower than the highest retention rank by a difference equal to a difference between the REPL in the matching entry and the lowest retention rank.

17. The cache management circuit of claim 14, further configured to reduce the REPL in the entry of the predictor table corresponding to the memory address of the data stored in the cache line selected for eviction by decrementing the REPL.

18. The cache management circuit of claim 14, further configured to reduce the REPL in the entry of the predictor table corresponding to the memory address of the data stored in the cache line selected for eviction by setting the REPL equal to the lowest retention rank.

19. The cache management circuit of claim 1, further comprising:
    a rank manager circuit configured to generate the retention rank of the cache line;
    a cache control circuit configured to receive the hit-miss indicator from the cache memory; and
    a predictive adjustment circuit configured to generate and store the cache control information.

20. A method for predictive adjustment of a cache control policy based on persistent cache control information, the method comprising:
    receiving a memory request comprising a memory address to access data at the memory address;
    receiving a hit-miss indicator from a cache memory, the hit-miss indicator indicating a cache hit in response to the data at the memory address being stored in the cache memory and indicating a cache miss in response to the data at the memory address not being stored in the cache memory;
    generating cache control information corresponding to the memory address based on the hit-miss indicator and the cache control policy;
    storing the cache control information corresponding to the memory address persistently, independent of whether the data is evicted from the cache memory;
    controlling generation of a retention rank of a cache line based on the stored cache control information;
    storing the cache control information in an entry in a predictor table corresponding to the memory address in the memory request, the predictor table comprising a plurality of entries for storing the cache control information, each entry corresponding to a memory address;
    recording an RLH pattern corresponding to the received memory request, the RLH pattern comprising retention ranks of cache lines in the cache memory accessed in consecutive memory requests;
    generating a hash of the RLH pattern and the memory address of the memory request; and
    storing the cache control information in the entry of the predictor table corresponding to the memory address of the memory request, the entry comprising an index matching the hash.

21. The method of claim 20, wherein:
    recording the RLH pattern further comprises recording retention ranks of all cache lines accessed in the cache memory.

22. The method of claim 20, wherein:
recording the RLH pattern further comprises recording retention ranks of all cache lines accessed in a set of a plurality of sets of a set-associative cache memory corresponding to the memory address.

23. The method of claim 20, wherein storing the cache control information in the entry in the predictor table further comprises:
storing a did_hit indicator indicating a cache hit corresponding to the memory address in the entry in the predictor table; and
storing a replacement likelihood (REPL) indicating a predictive rank for the cache line based on the retention rank of the cache line in the entry in the predictor table.

24. The method of claim 23, further comprising, in response to the hit-miss indicator indicating a cache hit for the memory address in the memory request:
finding a matching entry in the predictor table comprising an index that matches the hash of the RLH pattern and the memory address of the memory request;
determining that the did_hit indicator in the matching entry is reset;
determining that the REPL in the matching entry is equal to a lowest retention rank; and
in response to determining that the did_hit indicator in the matching entry is reset and the REPL in the matching entry is equal to the lowest retention rank:
setting the retention rank of the cache line to a highest retention rank;
setting the REPL in the matching entry equal to the highest retention rank; and
setting the did_hit indicator in the matching entry.

25. The method of claim 24, further comprising:
in response to determining that the did_hit indicator in the matching entry is set or determining that the REPL in the matching entry is not equal to the lowest retention rank:
determining that the retention rank of the cache line is lower than the REPL in the matching entry;
in response to determining that the retention rank of the cache line is lower than the REPL in the matching entry, setting the retention rank of the cache line to the REPL in the matching entry; and
setting the did_hit indicator in the matching entry.

26. The method of claim 24, further configured to:
in response to determining that the did_hit indicator in the matching entry is set or determining that the REPL in the matching entry is not equal to the lowest retention rank:
determining that the retention rank of the cache line is not equal to the lowest retention rank;
in response to determining that the retention rank of the cache line is not equal to the lowest retention rank, setting the REPL in the matching entry equal to the lowest retention rank; and
setting the did_hit indicator in the matching entry.

27. The method of claim 23, further comprising, in response to the hit-miss indicator indicating a cache miss for the memory address in the cache line:
finding a matching entry in the predictor table comprising an index that matches the hash of the RLH pattern and the memory address of the memory; and
in response to a probability determination:
resetting the did_hit indicator; and
setting the REPL to a highest retention rank.

28. The method of claim 27, wherein the probability determination ranges from a value at which the did_hit indicator is never reset to a value at which the did_hit indicator is always reset.

29. The method of claim 27, wherein the probability determination is based on a number of entries in the predictor table.

30. The method of claim 27, further comprising:
determining that no entry in the predictor table is found comprising an index that matches the hash of the RLH and the memory address of the memory request;
in response to determining that no entry in the predictor table is found comprising an index that matches the hash of the RLH and the memory address of the memory request:
allocating an entry in the predictor table comprising an index that matches the hash of the RLH and the memory address of the memory request;
setting the REPL in the allocated entry equal to the highest retention rank;
resetting the did_hit indicator; and
setting the retention rank of the cache line selected for eviction to the highest retention rank.

31. The method of claim 23, further comprising:
in response to the hit-miss indicator indicating a cache miss for the memory address in the memory request:
finding a matching entry in the predictor table comprising an index that matches the hash of the RLH pattern and the memory address of the memory request;
determining that the did_hit indicator in the matching entry is reset;
determining that the REPL in the matching entry is equal to a lowest retention rank; and
in response to determining that the did_hit indicator in the matching entry is reset and the REPL in the matching entry is equal to the lowest retention rank, bypassing inserting the data at the memory address into the cache memory.

32. The method of claim 31, further comprising:
in response to determining that the did_hit indicator in the matching entry is set or the REPL in the matching entry is not equal to the lowest retention rank:
accessing entries of the predictor table corresponding to the memory addresses of data in every cache line in a set of the set-associative cache memory corresponding to the memory address in the memory request;
determining that the did_hit indicator in every accessed entry is set;
in response to determining that the did_hit indicator in every accessed entry is set, selecting for eviction a cache line of the accessed cache lines comprising a retention rank equal to the lowest retention rank; and
in response to determining that the did_hit indicator in at least one accessed entry is reset:
selecting for eviction a cache line of the at least one accessed cache lines comprising the lowest retention rank; and
reducing the REPL in the entry of the predictor table corresponding to the memory address of the data stored in the cache line selected for eviction.

33. The method of claim 32, further comprising:
determining that the did_hit indicator in the matching entry is reset;
determining that the REPL in the matching entry is equal to the highest retention rank; and in response to determining that the did_hit indicator in the matching entry is reset and the REPL in the matching entry is equal to the highest retention rank, setting the retention rank of the cache line selected for eviction to the highest retention rank.

34. The method of claim 33, further comprising:
in response to determining that the did_hit indicator in the matching entry is set or the REPL in the matching entry is not equal to the highest retention rank, setting the retention rank of the cache line selected for eviction lower than the highest retention rank by a difference equal to a difference between the REPL in the matching entry and the lowest retention rank.

35. The method of claim 32, further comprising reducing the REPL in the entry of the predictor table corresponding to the memory address of the data stored in the cache line selected for eviction by decrementing the REPL.

36. The method of claim 32, further comprising reducing the REPL in the entry of the predictor table corresponding to the memory address of the data stored in the cache line selected for eviction by setting the REPL equal to the lowest retention rank.

37. The method of claim 24, further comprising:
determining that no entry in the predictor table is found comprising an index that matches the hash of the RLH and the memory address of the memory request;
in response to determining that no entry in the predictor table is found comprising an index that matches the hash of the RLH and the memory address of the memory request:
allocating an entry in the predictor table comprising an index that matches the hash of the RLH and the memory address of the memory request;
setting the REPL in the allocated entry equal to the retention rank of the cache line; and
setting the did_hit indicator.

* * * * *